April 27, 1926.

G. W. HEDSTROM

CAN TESTING MACHINE

Filed March 28, 1925

G. W. HEDSTROM

CAN TESTING MACHINE

Filed March 28, 1925    5 Sheets-Sheet 5

Inventor:
Gustav W. Hedstrom

Patented Apr. 27, 1926.

1,582,216

UNITED STATES PATENT OFFICE.

GUSTAV W. HEDSTROM, OF CHICAGO, ILLINOIS, ASSIGNOR OF ONE-HALF TO PETER W. FULFORD, OF CHICAGO, ILLINOIS; OLGA N. D. HEDSTROM ADMINISTRATRIX OF SAID GUSTAV W. HEDSTROM, DECEASED.

CAN-TESTING MACHINE.

Application filed March 28, 1925. Serial No. 18,947.

*To all whom it may concern:*

Be it known that I, GUSTAV W. HEDSTROM, a citizen of the United States, and a resident of Chicago, in the county of Cook and State of Illinois, have invented certain new and useful Improvements in Can-Testing Machines; and I do hereby declare that the following is a full, clear, and exact description thereof, reference being had to the accompanying drawings and to the characters of reference marked thereon, which form a part of this specification.

This invention relates to a novel machine for testing can bodies to detect leaks, either through the material of the can body or through joints which connect the can body parts, and the invention refers more particularly to a machine for so testing cans under the vacuum testing method.

The machine herein shown embodying my invention embraces, in combination with an extended track for the passage of can body carriers, preferably arranged as inclined fractional stretches or lengths joined in continuous to-and-fro relation, a combined assembling and vacuumizing mechanism at which the can bodies are assembled in airtight or sealed relation on the carriers and at which air is withdrawn from the sealed can bodies, whereby perfect can bodies will be caused to adhere to the carriers throughout the passage of the carriers through the machine by external air pressure, and whereby defective can bodies will be caused to drop off the carriers by reason of leakage of air thereinto, resulting in an equalizing of air pressure within and without the defective can bodies. The perfect can bodies will be carried through the length of the carrier track or support to a point where they are detached from the heads, either mechanically or by admission of air thereinto, while the cans which are not air-tight will drop off their carriers at different points in the travel of the carriers upon leakage of air thereinto. The carriers are caused to travel continuously and successively through the assembling and vacuumizing mechanisms where the bodies are assembled on the carriers and vacuumized and are thence caused to continuously travel along track-ways until released from the carriers by leakage of air into the bodies, or until the perfect cans reach the releasing station and are there dropped off into a suitable discharge chute; the carriers continuing their travel through and past the assembling and vacuumizing mechanism to receive and vacuumize other can bodies fed to said mechanism. The machine is, therefore, continuous in operation and the can bodies are automatically assembled on the carriers and are automatically released therefrom.

Among the objects of the invention is to produce a machine for this purpose which is capable of handling a large number of can bodies in a relatively compact space.

Another object of the invention is to produce a machine for efficiently testing can bodies having minute or slow leaks, which would not be detected by ordinary modes in common use.

Another object of the invention is to produce an improved machine into which the can bodies are successively fed and by which they are automatically assembled on carriers and sealed, to be progressively vacuumized and thereafter caused to pass slowly through the machine until the perfect can bodies are fully tested or the imperfect bodies drop away from the carriers.

Another object of the invention is to provide a novel mechanism for assembling can bodies and vacuumizing them, so constructed as to quickly, efficiently and economically reduce the pressure in the bodies to a predetermined low pressure before they begin to travel through the path provided therefor in the machine.

Another object of the invention is to produce a novel combined carrier and can body sealing device, which serves the double purpose of controlling the vacuumizing method and for carrying the can bodies through the machine.

Another object of the invention is to produce, in a machine of this character, a novel to-and-fro track for the can body carriers, so arranged that when the carriers are delivered thereto, they are caused to move over the supporting and guide tracks by gravity from the receiving to the discharge end of the machine.

Further objects of the invention are to otherwise improve, simplify and increase the capacity of machines for the purpose described, and the invention consists in the elements and combination of elements shown in the drawings and described in the specification, and is pointed out in the appended claims.

In the machine shown in the drawings for illustrating one embodiment of the invention.

The frame of the machine comprises a cast base 9, front and rear uprights 10, 11, and top, horizontal, side and cross pieces 12, 13, respectively, fabricated to produce a rigid skeleton frame structure.

Mounted on said frame is a track structure, designated as a whole by A (Figure 1), on which are supported and along which travel can body carriers 15, best shown in Figures 3, 4, 5, and 7, and hereinafter specifically described. The fabrication of the track structure is not herein detailed, but comprises as essential elements upper and lower guide bars 16, 17, between which are produced inclined track-ways to receive the carriers 15, and along which the carriers continuously travel from the track receiving station A' to the can body discharging station A², and preferably by gravity. As herein shown, the track structure is of zigzag or to-and-fro formation, it being made up of pairs of said track bars 16, 17, with the bars of each pair extending between and supported on the front and rear uprights 11; 11. The said uprights 11, 11 are formed on their inner sides, at the connections thereof with the track bars, with U-shaped recesses 18 which are so related to the track bars and to the track-ways between said bars as to constitute curved junctions to connect the ends of adjacent straight track-ways. The trackways thus formed are alternately inclined, and are continuously inclined in the direction of travel of the carriers 15 so that the carriers are continuously moved by gravity from the receiving to the discharge end of the track-way.

It may be preliminarily observed that each carrier 15 comprises a metal disc-like block of substantial thickness and weight, and is formed with a peripheral annular groove 19 to receive the adjacent margins of the track bars 16 and 17 and the like margins of the connecting recesses 18, whereby the carriers are maintained in vertical planes and are guided in travel through the said track-ways.

At the lower right hand corner of the frame is located a station B, including a combined can body feed, a can body and carrier assembling mechanism and a vacuumizing mechanism. The can bodies C are fed to said station through a feed runway 20. At said station B the can bodies are assembled and sealed on the carriers and, while traveling through said station, are vacuumized to an extent to be held on the carriers by external air pressure, to be thus held while the carriers and attached can bodies are passing through the machine.

Figure 2:
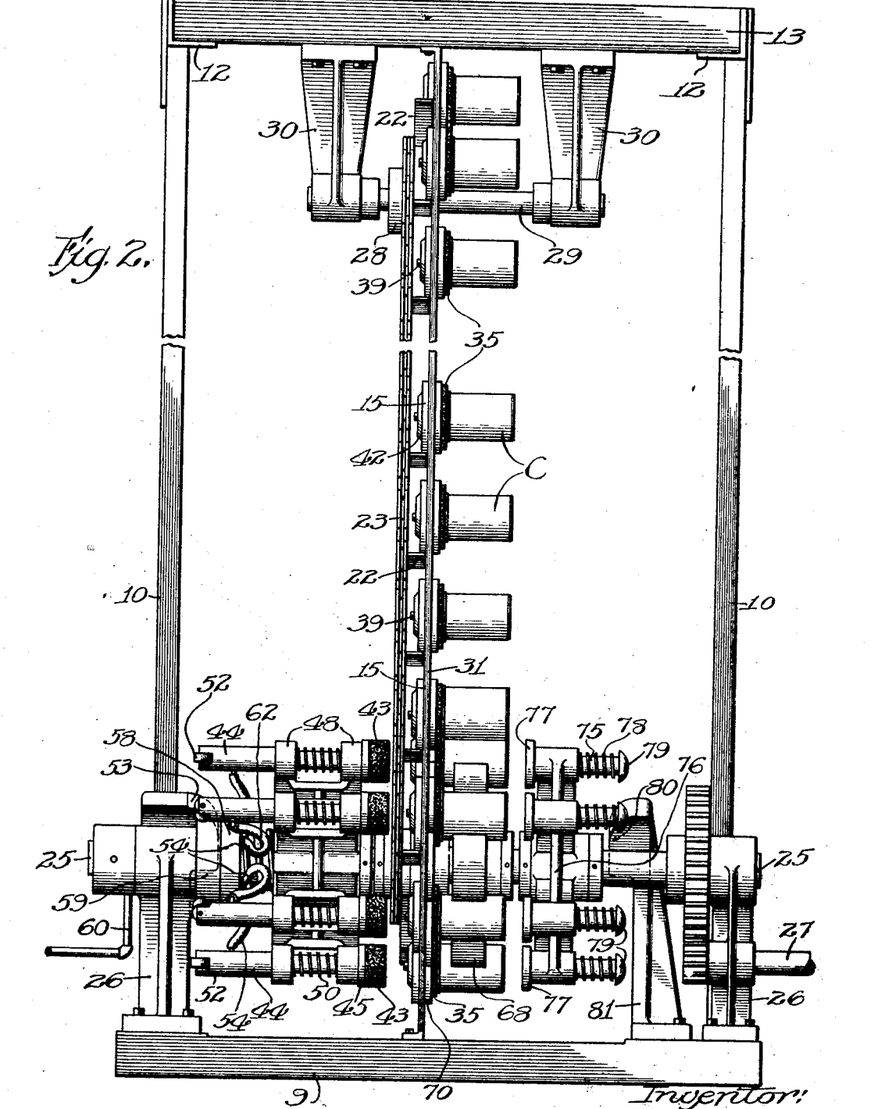
Figure 2 is an end view thereof.
Figure 5:
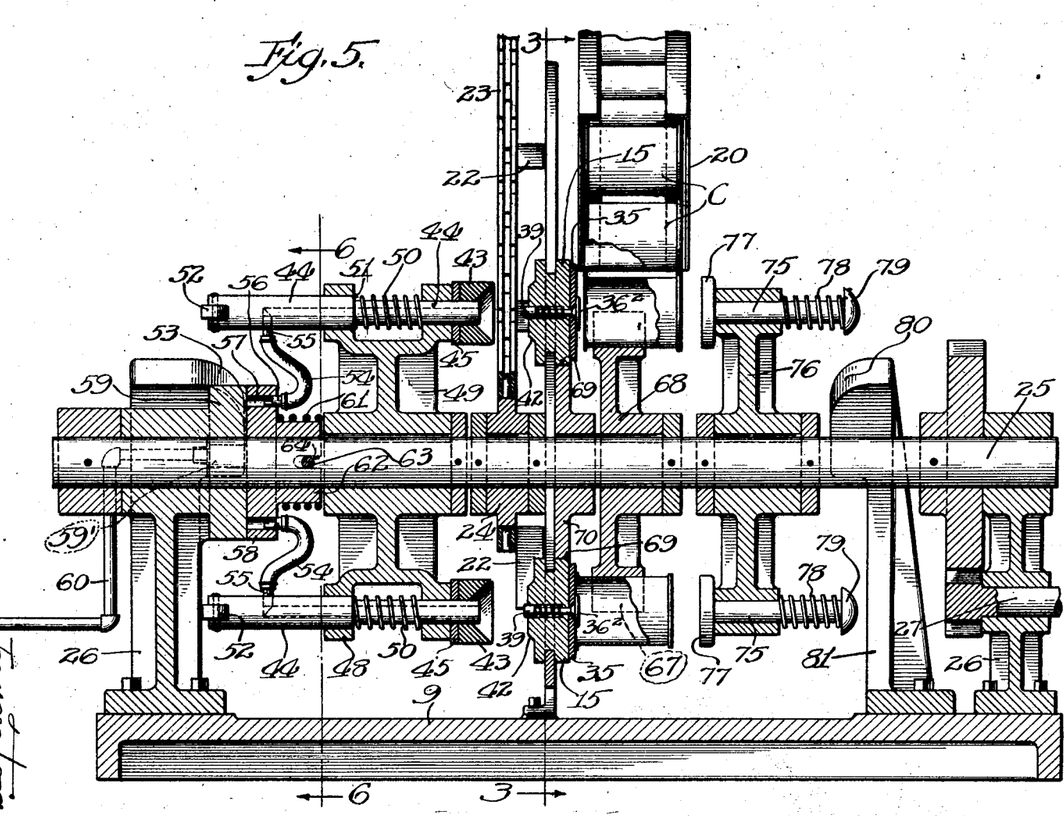
Figure 5 is a vertical section on the line 5—5 of Figure 1.

The carriers and attached can bodies are lifted from said station B by the lifting lugs 22 of an endless sprocket belt 23 which is trained at its lower end about and is driven by a sprocket wheel 24 that is keyed or otherwise fixed to a countershaft 25 at said station B, which carries the elements of the can body receiving the carrier and can body assembly and the vacuumizing mechanism, as will hereinafter more fully appear. Said shaft is mounted to rotate in bearings carried by standards 26 at the sides of the machine frame. The said countershaft is driven by a main drive shaft 27 and suitable reducing gears, as shown in Figures 2 and 5. The can body lifter chain or belt is trained at the top of the machine frame over a sprocket wheel 28, which is fixed to a short shaft 29 that is mounted to rotate in suitable hangers 30 depending from the upper side of the frame. The carriers and attached can bodies are guided in elevating movement from station B by engagement of the peripherally grooved carriers 15 with upright guide or track bars 31, forming between them an upright trackway which communicates with the receiving end of the track-way of the main track structure A through a short, inwardly and downwardly inclined track-way 33, formed between upper and lower track members. The can body carriers 15 are delivered from the main track-ways to station B, after the tested can bodies have been detached from the carriers through a short outwardly inclined track-way 34, also formed between upper and lower track members.

Referring now more fully to the construction of the carrier 15 for the can bodies C, and to the means for establishing therethrough partial vacuum in the attached and sealed can bodies, the said construction is best shown in Figures 2, 4, 5 and 7, and is made as follows:

Applied to the inner face of each carrier is a sealing disc 35, preferably made of rubber and cemented or otherwise fixed to said face. Said sealing disc is provided with a central hollow, conical valve seat 36 in line with the central opening 15' of the carrier, which is adapted for engagement with and controlled by a spring-closed, cone valve 36', whose tubular stem 37 extends through the central opening 15' of the carrier. The vacuum control valve is a combined cone and disc valve, it being formed inwardly beyond the cone portion with a radially enlarged, flat, disc-like flange 36² which is adapted to bear flat against the inner face of the sealing disc 35 when the valve is closed, as best shown in Figure 5.

The tubular valve stem 37 is formed just exterior to the cone valve 36' with radial ports to establish communication between said tubular stem and the can body when the valve 36' is in open position. Said tubular valve stem 37 extends outwardly into and is fixed rigidly in a nipple 39 which is slidingly fitted in the enlarged outer end of the carrier opening 15'. A valve seating spring 41 surrounds said tubular valve stem and is interposed between a shoulder in the central bore 15' of the carrier and the inner end of said nipple 39, said spring operating by expansion to seat said valve.

The outer face of each carrier is formed with a central boss 42 having a beveled periphery, over which is adapted to fit the internal coned face of a sealing cup 43 that surrounds and is fitted to the inner end of an exhaust tube 44, through which air is drawn from the can bodies. Said sealing cup is backed by a metal plate 45 that is rigidly fixed in any suitable manner to said exhaust tube. The exhaust tube 44 is axially displaceable and is adapted for engagement at its inner end, within the sealing cup 43, with the nipple 39 for the purpose of opening the valve 36' against the action of its sealing spring 41 to establish communication of the exhaust tube with the interior of a can.

There are a number of said exhaust tubes 44, which are angularly disposed about the shaft 25, before referred to, and said tubes 44 are slidingly supported in aligned openings in pairs of arms 48 of a spider 49 that is keyed on the said countershaft 25. Springs 50 are interposed between the inner spider arms 48 and shoulders 51 on the exhaust tubes 44 and serve normally to hold said tubes outwardly away from the carriers, as best shown in Figure 5; but permit said tubes to be forced inwardly, with the sealing cups 43 engaged with the bosses 42, and with the inner ends of the said tubes engaged with the nipples 39 to open the exhaust valves against the compression of their seating springs.

The said exhaust tubes 44, by reason of their connection to the spider 49, are caused to continuously revolve in a circular path, concentric to the axis of rotation of the countershaft 25. The said tubes are axially shifted while passing through a short arc of their movement through the coaction of rollers 52 thereon with a stationary cam 53 carried by an adjacent countershaft supporting standard 26. Upon movement of each exhaust tube inwardly by said cam, the inner end of the tube strikes the valve opening nipple 39 just after the sealing cup has been somewhat compressed on the boss 42, so that when the said valve 36' is open, the sealing cup 43 will prevent leakage of air to the can body, whereby a direct exhaust connection will be established from the can body to the exhaust tube to reduce the pressure in said can body.

The bores of the exhaust tubes 44 are connected to a space under negative pressure by connections made as follows:

Short lengths of hose 54 are connected between nipples 55 in communication with the exhaust tube bores and other nipples 56 that communicate with angularly spaced ports 57 of a flanged distributing collar 58 which surrounds and rotates with the countershaft 25 and is axially movable thereon. The ported face of said distributing collar is flat to bear with a close fit against the inner flat face of a fixed, single ported member 59 that is attached in any suitable manner to the adjacent standard. The port 59' of said member 59 is successively brought to register with the ports 57 through rotation of the distributing collar. The single port 59' is connected through a vacuum pipe 60 to any suitable space of low pressure.

Figures 6, 7:
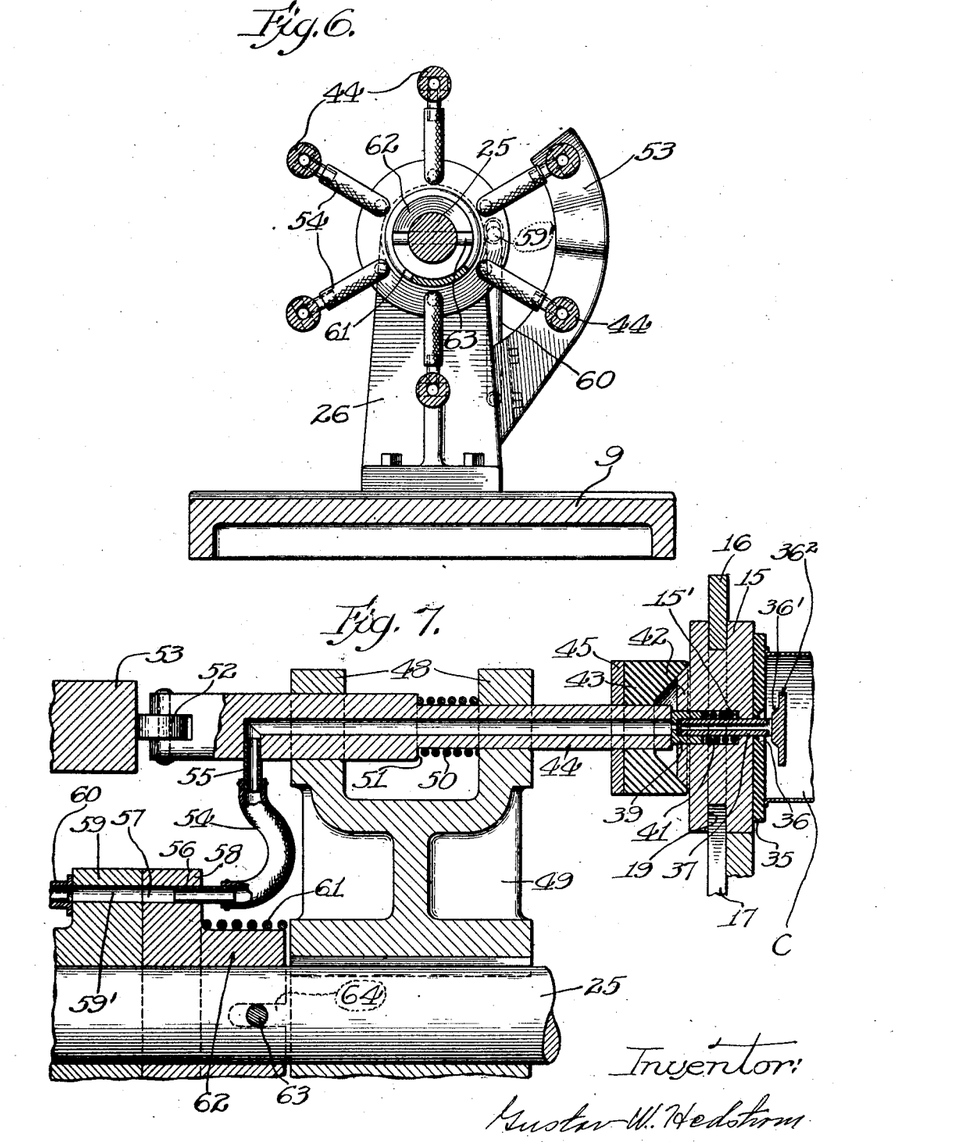
Figure 6 is a vertical section on the line 6—6 of Figure 5.
Figure 7 is a fragmentary section of the vacuumizing mechanism.

A spring 61 surrounds a sleeve 62 of the distributing collar 58, being interposed between the hub of the spider 49 and the said collar. Said spring maintains the ported face of the distributing collar pressed against the single ported face of the member 59, and automatically compensates for wear between said faces. The means for allowing axial displacement of the distributing collar 58 on the countershaft 25, through the action of the spring 61, comprise a pin 63 that extends through said shaft and engages inwardly opening diametric slots 64 in the sleeve extension 62 of said collar 58, as best shown in Figures 5 and 7.

The mechanism for assembling the can bodies on the carrier 15, preparatory to vacuumizing said bodies, by the means described, is made as follows:

The feed-way 20 directs the can bodies into the angularly spaced, peripheral pockets 67 of a spider 68 which is fixed and rotates with the countershaft 25. The can bodies are deposited in said pockets at the top of the spider and each can body, when so deposited is axially aligned with one of the exhaust tubes 44.

The can body carriers 15 are successively directed through the connecting chute 34 into peripheral, angularly spaced pockets 69 of a spider 70 fixed to the countershaft and disposed between the can body spider 68 and the lifter belt sprocket wheel 24, before referred to. The upper track bar of the chute 34 terminates short of the periphery of the carrier handling spider 70, but the lower track bar of said chute continues as a curved extension 71 around the assembling and vacuumizing mechanism to guidingly engage the peripheral grooves of the carriers to thereby guide them through said mechanisms. The curved guide bar 71 merges into the outermost guide or track bar 31, which cooperates with the mating inner track or guide bar to guide the carriers and the projecting, attached can bodies upwardly. It will thus be seen that the pockets 67 and 69, to respectively receive the can bodies and carriers, are equally angularly spaced about the axis of the countershaft and are always axially in line with each other and with the axes of the exhaust tubes 44.

The can bodies so delivered to the pockets of the spider 68 are endwise moved to be assembled with their open ends against the sealing discs 35 of the carrier 15 by means of a series of angularly spaced plungers 75 which are carried by and slidable in angularly spaced guide openings of a spider 76 that is keyed or otherwise made fast on the countershaft 25 to turn therewith. The angular spacing of said plungers brings them in axial alignment with the can bodies, the carriers and the exhaust tubes 44. Said plungers are formed on their inner ends with discs 77 to engage the closed ends of the can bodies, and are normally spring-held away from the can bodies by spiral, expansion spring 78 surrounding the plungers between the outer face of the spider 76 and the rounded heads 79 on the plungers.

The plungers are adapted to be pressed inwardly at the proper period during rotation of the spider 76, and also the spiders 68, 70 and 44, against the closed can body ends through the action of a stationary cam 80 that is supported on a standard 81 fixed to the base 9, just inside the adjacent bearing standard 26. Said cam 80 is opposite to the stationary cam 53 which actuates the sliding exhaust tubes 44, so that a can body assembling disc 77 is moved inwardly to seat the open end of a can body against the sealing disc 35 at the same time an opposing exhaust tube is moved inwardly to open the valve 36' and the sealing cup is thereby forced against the outer face of a can body carrier to seal the space which encloses the contacting ends of the exhaust tube and a companion nipple 39, through pressure of which the vacuum valve is opened. The open end of a can body is thus held sealed against the inner face of a carrier 15 when the valve 36' is opened, whereby there is established a sealed communication between the exhaust tube and the interior of the can body sufficiently to reduce air pressure within the can body to cause the can body to be held in overhanging attachment to the carrier in the manner best shown in Figures 2 and 4. The said stationary cams 53 and 80 need be made of short angular lengths, only sufficient to give ample time to assemble the can bodies on the carriers and to open the valves to partly vacuumize the can bodies.

After the can bodies have been vacuumized to the required extent, they are held on the carriers by external air pressure, and the carriers are caused to travel around the assembling and vacuumizing mechanism until the carriers and the attached can bodies are properly delivered into the vertical chute or trackway formed between the guide or track bars 31. Said carriers and attached can bodies are thus caused to travel over the curved track extension 71 by the sprocket chain lugs 22 and the interlock of the carriers with the revolving pockets 69; and the carriers remain in the influence of said lugs 22 and are thereby delivered to the upper end of the vertical track-way formed between the track or guide bars 31, from the upper end of which said carriers and the attached can bodies are delivered through the track-way 33 to the track-way formed between the upper and lower track bars 16 and 17. Thereafter the carriers roll down the track-ways by gravity until they reach the discharge or release station $A^2$.

Figures 3, 4:
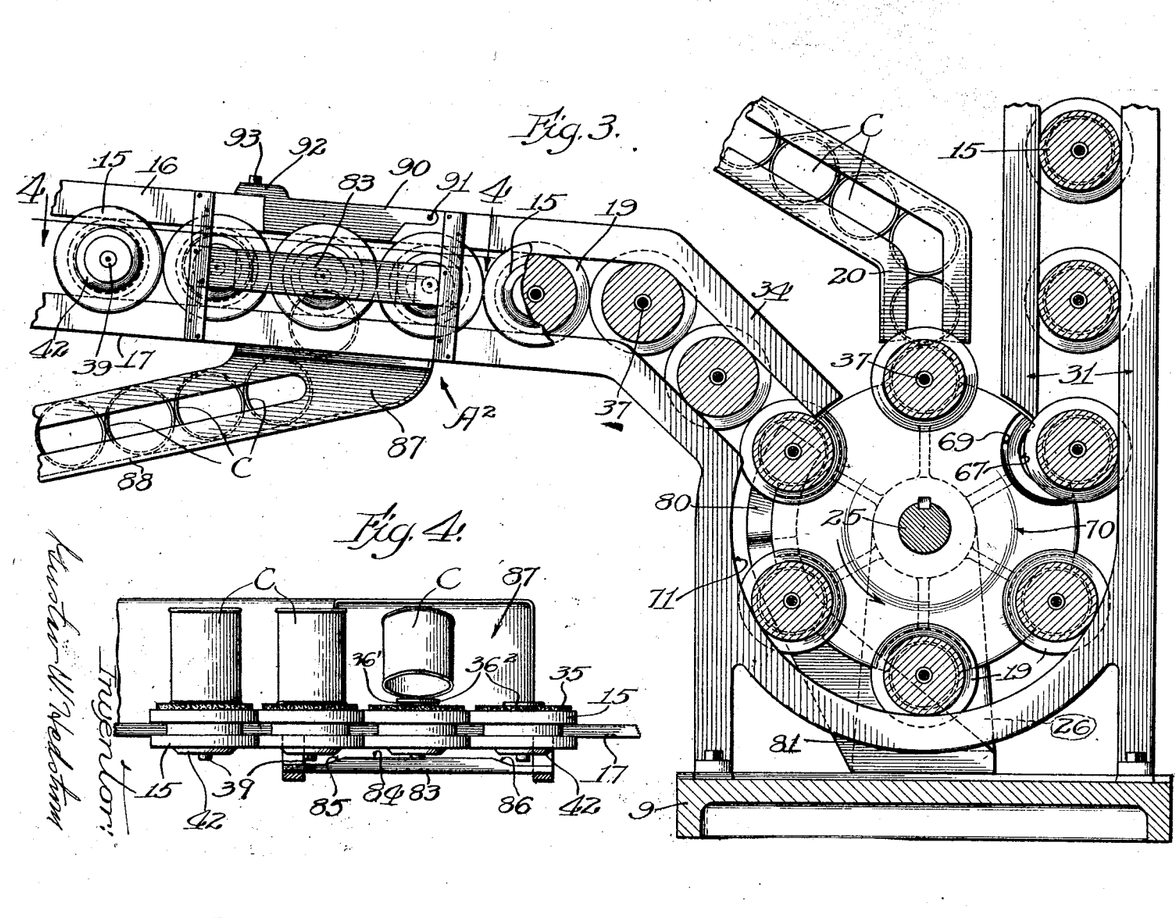
Figure 3 is a section on the line 3—3 of Figure 5.
Figure 4 is a horizontal section on the line 4—4 of Figure 3.

At the discharge or release station $A^2$ there is arranged a stationary valve opening cam bar 83 which is fixed to the track structure in any suitable manner to open the valves 36' as the carriers pass said station and thereby permit internal and external equalization of air pressure on the can bodies, whereby they drop by gravity to a suitable place of disposal for said bodies. As herein shown, the cam bar 83 is provided with an intermediate raised portion 84 and with ascending and descending cam portions 85, 86, respectively. Said cam bar is located in a straight portion of the track-way, parallel to the path of movement of the vent nipples 37, as best shown in Figure 4, and in such position that the ascending cam portion 85 serves, by contact with said nipples, to open the vacuum controlling valves. The intermediate straight portion 84 of the cam bar serves to hold said valves open a sufficient length of time to equalize air pressure on the inner and outer sides of the can bodies, whereupon the perfect can bodies will drop by gravity into the receiving end 87 of a downwardly and rearwardly inclined discharge chute 88.

The defective can bodies drop by gravity away from the carriers during the travel of the latter through the track system, by reason of leakage of air into such defective can bodies, resulting in an equalization of air pressure on the inner and outer sides of said bodies. The length of travel of the can bodies through the machine is such as to give ample time for the equalization of air pressure inside and outside the can bodies during the relatively slow travel of the can bodies through the machine, whereby can bodies having very minute leaks will be automatically detected and allowed to drop away from their carriers before they reach the automatic valve opening device at the release station $A^2$.

It will be observed that a machine embodying my invention has efficient capacity for testing a large number of cans, inasmuch as the carriers, when delivered to the system of inclined track-ways, roll down said trackways in closely spaced relation. It will also be observed that the total length of the track-way, with a moderate speed of travel of the carriers and can bodies through the machine, gives ample time for detecting defective cans, notwithstanding that the leaks be so small as to be otherwise non-detectable. A further advantage of the machine shown is that the can bodies can be delivered to and discharged from the machine at closely spaced stations, whereby the carriers are active throughout practically the entire length of travel of the carriers through the machine for sealing engagement with the can bodies, thus providing a maximum length of carrier travel during which the can bodies are under active test for leaks. The machine maintains the carriers in constant motion and automatically and quickly assembles the can bodies on said carriers and adequately vacuumizes said bodies and thereafter maintains them in testing position on the carriers until the defective can bodies drop off the carriers, or until they are released at the releasing station $A^2$.

The can body and carrier assembling mechanism and vacuumizing mechanism are constructed and arranged to be exceedingly compact, and by reason of the fact that the elements of these various mechanisms are carried by and rotate with the countershaft 25, it is assured that the assembling and evacuating or vacuumizing mechanism will always be maintained in alignment, liability of lost motion of the aligned parts being negligible. The location and interaction of the assembling and vacuumizing mechanisms at one station contributes to the further advantage of simplifying the mechanism and reducing power necessary to efficiently drive said mechanism.

Figure 1:
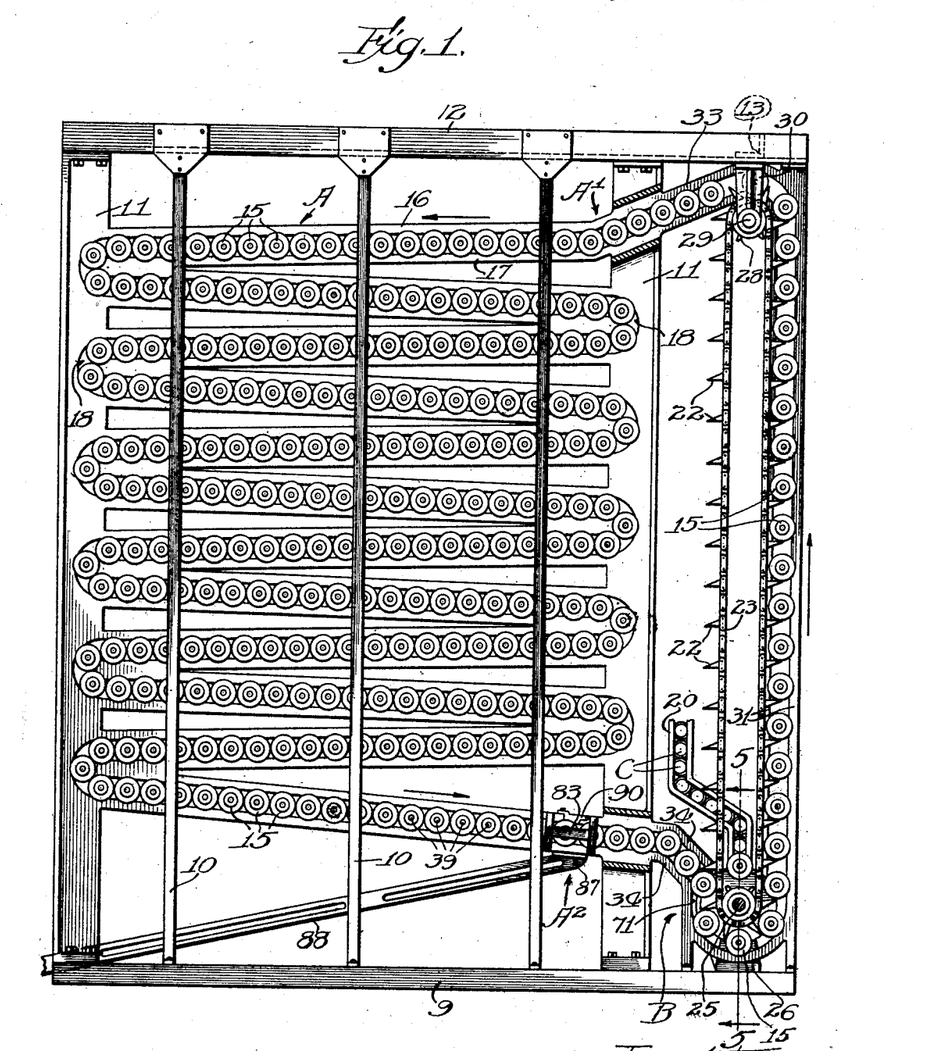
Figure 1 is a side view of the machine, with the parts in section.

The lowermost section of the track-way, as shown in Figures 1 and 3, is provided with a normally closed inlet and outlet opening through which the carriers can be inserted into or removed from the track-way. This is effected by interrupting the upper track bar 16 adjacent to the release station $A^2$ to produce an opening of a length to permit the carrier to be passed therethrough, and closing the said opening by a closure bar 90 of a cross section to correspond with the track bar 16. Said bar is herein shown as hinged at one end by a pin 91 to the upper track structure, and is provided at its other end with an offset lip 92 which rests on the upper edge of the broken away track bar 16. Said hinge closure may be locked in place by a set screw 93 extending through said lip and into the subjacent track bar.

While the sealing disc 35 is shown as adapted to a flanged open end can body, it is obvious however that said sealing disc may be adapted to any can body having one closed end and having any kind of an opening at its other end through which air may be exhausted to hold the can body sealed against said disc. Such necessary changes as may be required to adapt the disc to other kinds of open ended cans fall within the scope of the appended claims. So also the said carrier provided or faced with the sealing disc, which latter has a valve seat through which air passes from or into the can body for testing purposes, may be employed in a pressure testing machine, without departure from the spirit of the invention recited in the appended claims.

I claim:

1. A machine for testing can bodies comprising a to-and-fro track-way for can body carriers, with adjacent stretches disposed at an angle relatively to each other in the direction of travel of the carriers thereupon, said stretches being united at their ends to constitute a continuous track-way.

2. A machine for testing can bodies comprising guide bars forming a to-and-fro track-way for can body carriers, with adjacent stretches disposed at an angle relatively to each other in the direction of travel of the carriers thereupon, said stretches being united at their ends to constitute a continuous track-way, said guide bars being disposed in the same vertical plane to constitute guides for peripherally grooved can body carriers.

3. A machine for testing can bodies comprising a track-way for can body carriers formed between a plurality of pairs of to-and-fro disposed track bars to produce track-way stretches, the adjacent stretches being disposed at diverging angles from end to end of said stretches, and connected at their ends nearest adjacent to each other to constitute a to-and-fro continuously inclined track-way for the travel of can body carriers thereon.

4. A machine for testing can bodies comprising a track structure for can body carriers, including front and rear uprights, and track bars extending therebetween and supported thereon and arranged as upper and lower pairs to constitute track-way stretches, said uprights being formed with track-way connecting recess to join the said stretches as a continuous to-and-fro track-way.

5. A can body tester comprising a track structure, including a continuous track-way for can body carriers formed by end-joined inclined track-way stretches, the receiving end of the track-way being at the top of said structure at one end thereof and the discharge end of the trackway being at the bottom and at the same end of the structure, and a series of can body carriers travelable on said track-ways.

6. A can body tester comprising a track structure, including a continuous track-way for can body carriers formed by end-joined inclined track-way stretches, the receiving end of the track-way being at the top of said structure at one end thereof and the discharge end of the track-way being at the bottom and at the same end of the structure, a series of can body carriers travelable on said track-ways, and conveyor means at the latter end of the structure for elevating can body carriers from the discharge end of said track-way to the receiving end thereof.

7. A can body tester comprising a track structure, including a continuous track-way for can body carriers formed by end-joined inclined track-way stretches, the receiving end of the track-way being at the top of said structure at one end thereof and the discharge end of the track-way being at the bottom and at the same end of the structure, mechanisms at the discharge end of said track-way to receive can body carriers and can bodies and for assembling said bodies on the carriers and for evacuating the can bodies when assembled on the carriers, and means for lifting the carriers and attached can bodies from said mechanisms to the receiving end of said track-way.

8. A can body testing machine comprising, in combination with a series of rolling can carriers and an inclined track upon which said carriers roll, of mechanism to assemble the can bodies on said carriers and to seal the open ends of the can bodies, mechanism to vacuumize the can bodies when so assembled and sealed, and means successively to convey the carriers and assembled and vacuumized can bodies to the receiving end of said track-way.

9. A can body testing machine comprising, in combination with a series of rolling can carriers and an inclined track upon which said carriers roll, of mechanism to assemble the can bodies on said carriers and to seal the open ends of the can bodies, mechanism to vacuumize the can bodies when so assembled and sealed, and an endless elevating conveyor trained about pulleys, one at said assembling and vacuumizing mechanisms and the other adjacent to the receiving end of said track-way and provided with carrier moving and lifting lugs.

10. A can body testing machine comprising, in combination with a series of rolling can carriers and an inclined track upon which said carriers roll, of mechanism to assemble the can bodies on said carriers and to seal the open ends of the can bodies, mechanism to vacuumize the can bodies when so assembled and sealed, an endless elevating conveyor trained about pulleys, one at said assembling and vacuumizing mechanisms and the other adjacent to the receiving end of said track-way and provided with carrier moving and lifting lugs, and upright guide bars for said carriers to guide them in movement while engaged by said lifting lugs.

11. A can body testing machine comprising an extended track-way, a series of free can body carriers and means to cause them to travel along said track-way, combined with mechanism to assemble the can bodies on the carriers to project axially and in overhanging relation therefrom and with their open ends sealed by the carriers, mechanism to vacuumize the can bodies when so sealed, and means to convey the assembled carriers and can bodies to the receiving end of said track-way.

12. A can body testing machine comprising an extended track-way, a series of free can body carriers and means to cause them to travel along said track-way, combined with mechanism to assemble the can bodies on the carriers to project axially and in overhanging relation therefrom and with their open ends sealed by the carriers, mechanism to vacuumize the can bodies when so sealed, means to convey the assembled carriers and can bodies to the receiving end of said track-way, and means near the discharge end of said track-way to remove the can bodies from said carriers.

13. A can body testing machine comprising an extended track-way, a series of free can body carriers and means to cause them to travel along said track-way, combined with mechanism to assemble the can bodies on the carriers to project axially and in overhanging relation therefrom and with their open ends sealed by the carriers, mechanism to vacuumize the can bodies when so sealed, means to convey the assembled carriers and can bodies to the receiving end of said track-way, and can body venting means near the discharge end of said track-way.

14. A can body testing machine, including a series of can body sealing and supporting carriers on which can bodies, partially vacuumized, are held by external air pressure, comprising combined carrier and body assembling means and can body vacuumizing means, embracing a series of collectively aligned and angularly spaced carrier and can body supports, said assembling means including also a series of plungers severally aligned with said supports, actuating means for said plungers to assemble can bodies in sealing relation on the carriers, and an angularly spaced series of vacuumizing means operative, when the can bodies are assembled on and sealed against said carriers, to vacuumize the can bodies.

15. A can body testing machine including a series of can body sealing and supporting carriers on which can bodies, partially vacuumized, are held by external air pressure, a rotative shaft, spiders spaced along and fixed to and rotative with said shaft, certain of the spiders having peripheral, angularly spaced pockets to receive and hold the carriers and can bodies in alignment, angularly spaced plunger means carried by one of said spiders and severally aligned with the carrier and can body spider pockets, means for actuating the plunger means to force the can bodies in sealing relation against said carriers, and vacuumizing means operative, when the can bodies are assembled on and sealed against said carriers, to vacuumize the can bodies.

16. A can body testing machine including a series of can body sealing and supporting carriers on which can bodies, partially vacuumized, are held by external air pressure, comprising means for assembling the can bodies on said carriers in sealing relation thereto, said carriers being provided with openings through which the can bodies are vacuumized and vented, normally spring-closed valves controlling said vacuumizing and vent openings, endwise movable exhaust tubes connected to a source of vacuum, and means to force said tubes toward the carriers to open said valves.

17. A can body testing machine including a can body sealing and supporting carrier having a vacuumizing and a vent opening, and on which a can body, partially vacuumized, is held by external air pressure, comprising means to assemble the open end of the can body endwise against one side of the carrier and to seal it on said carrier, means whereby the can body is vacuumized through said vacuumizing and vent opening when the can body is assembled on and sealed against the carrier, a spring-closed valve to control said opening, and an endwise movable exhaust tube in line with said valve and adapted by movement toward the carrier to open said valve and to establish communication between the interior of said can body and said exhaust tube.

18. A can body testing machine including a series of can body sealing and supporting carriers on which the can bodies, partially vacuumized, are held by external air pressure, comprising means to assemble the open ends of the can bodies endwise against and seal them on one side of said carriers, said carriers being provided with central valve-controlled vacuumizing and vent openings, and a series of angularly spaced, endwise movable exhaust tubes adapted for connection to a vacuum and adapted by endwise movement to open said valves, and to establish communication between the interiors of the can bodies and said tubes.

19. A can body testing machine comprising a series of can body sealing and supporting carriers having valve-controlled vacuumizing and vent openings, means to assemble the open ends of the can bodies against one side of, and seal them on, said carriers around said openings, endwise movable exhaust tubes adapted for connection to a vacuum and adapted by endwise movement to open the valves of said carriers and establish communication of said tubes to the interiors of the can bodies, a rotative shaft, a ported distributing collar mounted on and rotating with said shaft, with the ports thereof angularly spaced and severally connected to said exhaust tubes, and a fixed member having a single port adapted by rotation of said distributing collar to be brought successively in communication with the ports of said collar.

20. A can body testing machine comprising a series of can body sealing and supporting carriers having valve-controlled vacuumizing and vent openings, means to assemble the open ends of the can bodies against one side of, and seal them on, said carriers around said openings, endwise movable exhaust tubes adapted for connection to a vacuum and adapted by endwise movement to open the valves of said carriers and establish communication of said tubes to the interiors of the can bodies, a rotative shaft, a ported distributing collar mounted on and rotating with said shaft, with the ports thereof angularly spaced and severally connected to said exhaust tubes, and a fixed member having a single port adapted by rotation of said distributing collar to be brought successively in communication with the ports of said collar, the ports of said collar and member opening on flat bearing faces thereof, and means to spring-hold the ported faces of said collar and member on each other.

21. In a can body testing machine, the combination with a carrier provided with a central vent and vacuumizing opening, of means for assembling and sealing a can body on one side of the carrier around said opening, a valve to control said vacuumizing and vent opening, and a slidingly mounted exhaust tube movable toward and from the other face of the carrier for opening said valve and for establishing communication between said tube and the interior of a can body supported and sealed on said carrier.

22. In a can body testing machine, a disc-like rolling carrier provided with a continuous peripheral groove to engage the margins of carrier supporting and guide rails of a carrier supporting track-way, and a sealing member on one face of said carrier.

23. In a can body testing machine, a ported can body carrier faced on one side with a can body end sealing member having formed therein a central valve seat communicating with the carrier port, and a valve co-operating with said seat.

24. In a can body testing machine, a ported can body carrier faced on one side with a can body end sealing member, a central seat on said side communicating with the carrier port, and a valve to close on said seat and having an actuating stem projecting through said port and beyond the side of the carrier opposite said sealing member.

25. In a can body testing machine, a can body carrier having on one face a yielding can body end sealing disc and centrally thereof with a yielding valve seat, and a valve engaging said valve seat.

26. In a can body testing machine, a can body carrier having on one face a yielding can body end sealing disc and centrally thereof with a yielding valve seat, a spring-held valve engaging said seat, and means whereby said valve may be opened against the action of the sealing spring of said valve.

27. In a can body testing machine, a carrier provided with a central vacuumizing and vent opening, a can body sealing disc on one face of the carrier through which said opening extends, a spring-closed valve engaging a seat on said sealing disc to control said opening and provided with a stem extending outwardly through and beyond the other face of said carrier and adapted for contact, beyond the latter face of the carrier, with a valve opening device.

28. In a can body testing machine, a carrier provided with a central vacuumizing and vent opening, a can body sealing disc on one face of the carrier through which said opening extends, a spring-closed valve engaging a seat on said sealing disc to control said opening and provided with a stem extending outwardly through and beyond the other face of said carrier and adapted for contact, beyond the latter face of the carrier, with a valve opening device, said carrier being provided with a continuous peripheral groove to engage the margins of a carrier-supporting track-way.

29. In a can body testing machine, a disc-like rolling carrier having a peripheral tread surface for supporting the same in its rolling movements, said carrier having on one face a sealing member and having a passage extending through the same, and a valve controlling said passage.

In witness whereof I claim the foregoing as my invention, I hereunto append my signature this 3rd day of March, 1925.

GUSTAV W. HEDSTROM.